US000001412H

United States Statutory Invention Registration [19]

[11] Reg. Number: H1412

Kline et al.

[43] Published: Feb. 7, 1995

[54] SABOT STIFFENER FOR KINETIC ENERGY PROJECTILE

[75] Inventors: Roy W. Kline, Newton; Chiu H. Ng, Wharton, both of N.J.

[73] Assignee: The United States of America as represented by the Secretary of the Army, Washington, D.C.

[21] Appl. No.: 197,783

[22] Filed: Feb. 16, 1994

[51] Int. Cl.[6] ..... F42B 14/06

[52] U.S. Cl. ..... 102/521; 29/1.2

*Primary Examiner*—Harold J. Tudor

[57] ABSTRACT

Stiffeners between sabot petals resist bending of a kinetic energy projectile, and thereby reduce aiming dispersion. The stiffeners compensate for material removed during the separation of an annular sabot into individual sabot petals, thereby eliminating the need for post-assembly machining to restore a circular perimeter. The stiffeners may extend radially from the surface of the kinetic energy projectile to the gun bore, for direct force carry-through, to reduce flexure and whip. In one embodiment, a thick portion on each stiffener fits into a notch in the abutting sabot petals to strengthen the sabot in a manner similar to an "I" beam.

7 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

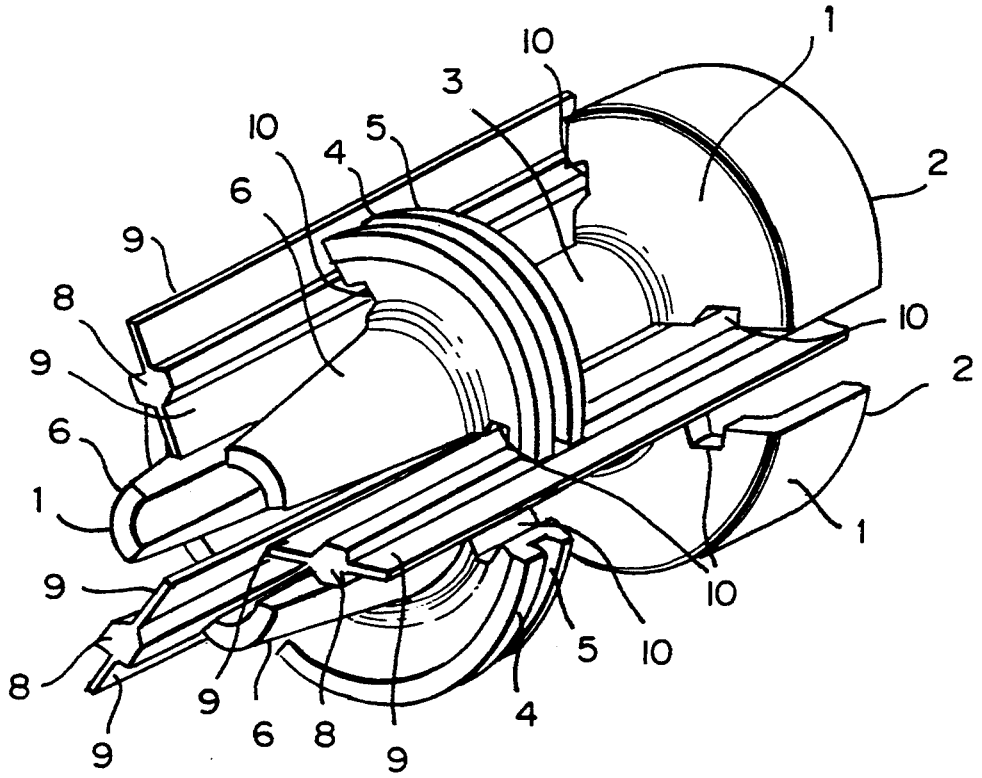

SABOT STIFFENER FOR KINETIC ENERGY PROJECTILE

The invention described herein may be manufactured, used and licensed by or for the Government for Governmental purposes without the payment to us of any royalties thereon.

BACKGROUND OF THE INVENTION

The present invention relates to sabot-launched/fin-stabilized kinetic energy projectiles. More particularly, the present invention relates to a sabot having a stiffener for a kinetic energy projectile with a penetrator of a type that is launched at high muzzle velocity.

A typical fin-stabilized kinetic energy projectile consists of a rod-type penetrator, a penetrator cap at the front end and a fin assembly at the rear end. The sabot tightly clamps about the kinetic energy projectile to seal against the passage of explosive gasses by sealing against the kinetic energy projectile and against the gun bore. This permits the stabilizing fins to pass through the gun bore without contact therewith. Just after the kinetic energy projectile and sabot leave the gun bore, aerodynamic forces strip the sabot from the kinetic energy projectile. The kinetic energy projectile continues toward the target. Wind resistance, which reduces the velocity, is decreased by discarding the sabot.

When launched, the kinetic energy projectile possesses kinetic energy according to the relation $KE=(\frac{1}{2})mv^2$, where the velocity v is typically in the range between about 1500 m/s to about 2000 m/s. Thus, a kinetic energy projectile with mass m achieves its maximum kinetic energy by being launched at the greatest possible velocity. The penetrator is made of a heavy metal, such as tungsten or depleted uranium, in order to give it as great a mass as possible. Since the force available to launch the kinetic energy projectile is a constant, reducing the mass of the system in the gun bore (kinetic energy projectile plus sabot) increases the velocity and increases the total kinetic energy of the kinetic energy projectile.

A sabot is used to cause the kinetic energy projectile to maintain its proper place and position in the bore of a gun when launched. Since the diameter of a kinetic energy projectile is much smaller than the diameter of the gun bore in which it is used, a sabot is sized to the diameter of the gun bore. A sabot holds a kinetic energy projectile as the sabot and kinetic energy projectile together are launched through the gun bore and separates from the kinetic energy projectile immediately after the kinetic energy projectile leaves the gun barrel.

A problem encountered in the launching of fin-stabilized kinetic energy projectiles with long penetrators at high muzzle velocities is the presence of aiming dispersion between successive rounds. That is, successive kinetic energy projectiles will not hit the same target location, but will impact in a scattered pattern around a nominal location on the target. One factor causing this scattered pattern is in bore flexing of the kinetic energy projectile, which permits successive kinetic energy projectiles, upon emerging from the bore, to fly in slightly different initial directions. One reason for the existence of this flexing is that fin-stabilized kinetic energy projectiles typically have a length-to-diameter ratio of about 20 or greater. A length-to-diameter ratio of this magnitude creates a tendency for the kinetic energy projectile to flex in "limber-rod" fashion, absent some means of stabilization.

A second reason for the existence of this flexing is the presence of a clearance between the sabot and the gun barrel. The sabot cannot have exactly the same diameter as the gun bore. Machining tolerances and continued launching of kinetic energy projectiles from the gun bore also add to the slight clearance between the sabot and the bore. In order to reduce the sabot mass as much as possible, the sabot diameter is reduced a great deal at its longitudinal center, while maintaining contact with the gun bore toward its ends. This clearance between the sabot and the gun bore allows the kinetic energy projectile to bend, albeit slightly, within the gun bore while it is being launched at high velocity. The angular velocity and an associated flexing frequency or bending frequency imparted to the kinetic energy projectile and its sabot as a result of its buffeting balloting within the gun bore results in high angular and lateral impulse forces and moments on the kinetic energy projectile as it exits the gun bore. The kinetic energy projectile exits the gun bore in a direction slightly biased in a random direction from that indicated by the axis located through the center of the gun bore. Aiming dispersion between successive rounds results because each kinetic energy projectile exits the gun in a slightly different direction and with a slightly different angular orientation and angular acceleration, and thus flies a slightly different path, with the path differences being substantially randomly arranged about the path which would be taken in the absence of kinetic energy projectile flexing.

A solution to the aiming dispersion problem entails minimizing the in-bore flexing of the kinetic energy projectile by stiffening its sabot. One way of stiffening a sabot is to make it from a stiffer material, such as steel. Another way of stiffening a sabot is to make it from a lightweight material, such as aluminum or. metal-matrix composite, but to make it heavier and thicker by using greater amounts of material. This approach was described in technical report BRL-TR-3359, written by Kaste & Wilkerson of the U.S. Army Ballistic Research Laboratory and published in June, 1992. The authors conducted an analytical study on the effect of stiffening the sabot of the XM900E1 kinetic energy projectile through the use of a heavier and thicker aluminum sabot. Their results show that the yaw of the kinetic energy projectile reduces by a factor of one-half when the heavier and stronger sabot is used.

Both solutions, however, result in a degradation of the performance of the penetrator since, because the energy contained in the propellant used to launch the kinetic energy projectile is constant, using the heavier sabot reduces the velocity of the kinetic energy projectile, thereby imparting a lower kinetic energy to the penetrator.

The prior art sabot manufacturing method has high production costs. The method uses three or four circular cylindrical sections, or sabot petals, which are assembled into a cylinder. The assembled cylinder is then machined to the specified sabot shape. Kinetic energy projectiles typically employ four or six fins. If three sabot petals are used, each section covers 120° of arc; if four petals are used, each section covers 90° of arc. Sabot petals are used instead of one solid cylinder so the sabot is almost immediately separated by aerodynamic forces after the kinetic energy projectile leaves the gun bore. During sabot discard, the sabot petals are stripped away from the kinetic energy projectile by aerodynamic forces generated at an air scoop. The sabot petals avoid the stabilizing fins as the sabot is discarded.

The sabot petals are cut from a solid cylinder, but portions of cylinder material are inevitably removed during the cutting process. The solid cylinder must thus have a greater outside diameter than the maximum sabot diameter so that the diameter of the assembled cylinder approximates the sabot diameter. Further machining is required when the assembled cylinder is formed since its outside curve is no longer exactly circular due to the cutting process.

OBJECTS AND SUMMARY OF THE INVENTION

Accordingly, it is an object of the present invention to minimize the aiming dispersion of successive rounds of sabot-supported finned kinetic energy projectiles fired from a gun bore.

It is a further object of the present invention to minimize the in-bore flexing of a kinetic energy projectile.

It is a still further object of the present invention to maximize the kinetic energy of a penetrator upon impact.

It is an even further object of the present invention to allow each sabot petal to be manufactured from a single cylinder having the maximum sabot diameter without any subsequent machining of the assembled sabot.

Briefly stated, the present invention provides stiffeners between sabot petals to resist bending of a kinetic energy projectile, and thereby reduce aiming dispersion. The stiffeners also compensate for material removed during the separation of an annular sabot into individual sabot petals, thereby eliminating the need for post-assembly machining to restore a circular perimeter. The stiffeners may extend radially from the surface of the kinetic energy projectile to the gun bore, for direct force carry-through, to reduce flexure and whip. In one embodiment, a thick portion on each stiffener fits into a notch in the abutting sabot petals to strengthen the sabot in a manner similar to an "I" beam.

According to the present invention, a stiffener for a sabot of a kinetic energy projectile comprises means for transmitting a bending moment from the sabot of the kinetic energy projectile to the stiffener.

According to an embodiment of the invention, there is provided a sabot for a kinetic energy projectile comprising: a plurality of sabot petals, the plurality of sabot petals fitting together to form an annulus about the kinetic energy projectile, a stiffener, radially disposed between each pair of adjacent edges of the sabot petals, and stiffening means in each of the stiffeners for resisting a bending of the kinetic energy projectile, whereby an aiming dispersion is reduced.

According to a feature of the invention, there is provided a sabot for a kinetic energy projectile comprising: a plurality of sabot petals, the plurality of sabot petals fitting together to form an annulus about the kinetic energy projectile, a stiffener, radially disposed between each pair of adjacent edges of the sabot petals, the stiffener having a thin portion and a thick portion, a notch in at least one sabot petal accommodating the thick portion, and permitting means for permitting the stiffener and the plurality of sabot petals to be aerodynamically discarded independently of each other.

According to a further feature of the invention, there is provided a method for manufacturing a sabot for a kinetic energy projectile comprising: forming an annular sabot, radially cutting the annular sabot at a plurality of locations to form a plurality of sabot petals, the step of radially cutting removing a predetermined width of material from the annular sabot, assembling the plurality of sabot petals into an annulus, the step of assembling including placing a stiffener between each adjacent pair of edges of the plurality of sabot petals, and the stiffener having a thickness substantially equal to the predetermined width, whereby the annulus has a diameter substantially equal to a diameter of the annular sabot before the step of radially cutting.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3(*a*) is a side view of a stiffener according to the present invention.

FIG. 4(*a*) is an exploded view of a sabot petal separating from a stiffener.

DETAILED DESCRIPTION OF THE PREFERRED EMBODIMENT

Figure 1:
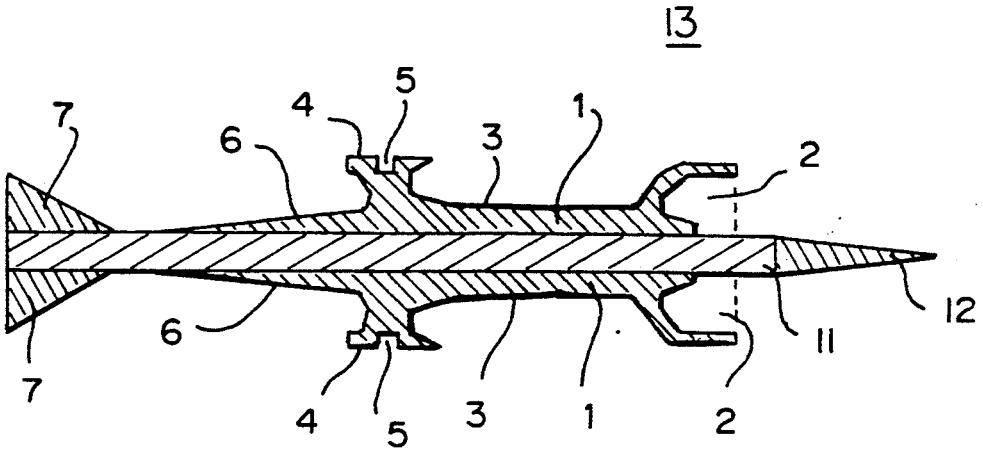
FIG. 1 PRIOR ART
FIG. 1 is a cross-section of a prior art kinetic energy projectile.
Figure 2:
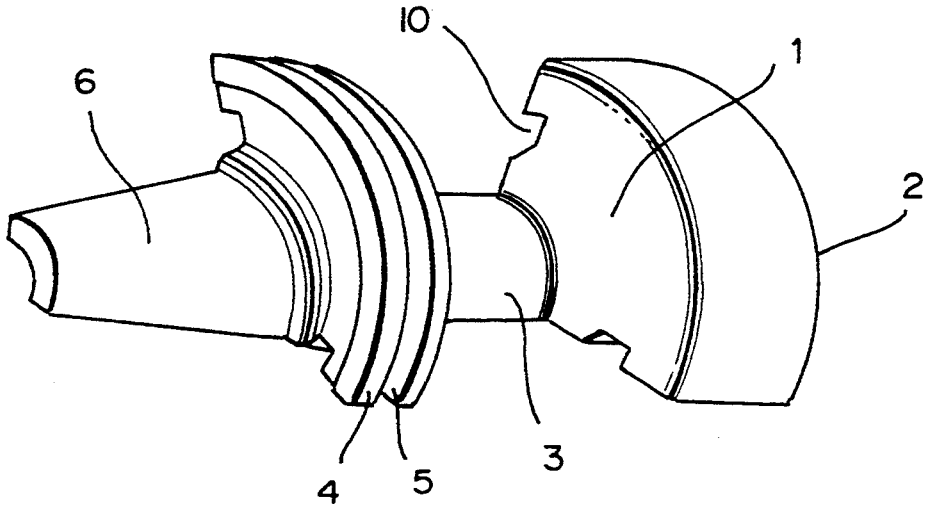
FIG. 2 PRIOR ART
FIG. 2 is an exploded perspective view of a sabot petal of FIG. 1.

Referring to FIG. 1, a prior art kinetic energy projectile 13 comprises a penetrator 11, a rod tip and windscreen 12, and stabilizing fins 7. Penetrator 11 is typically manufactured from a heavy material, such as tungsten or depleted uranium. Sabot petals 1 consist of a front air scoop 2, a saddle 3, a bulkhead 4, an obturator slot 5, and a rear ramp 6. A concave interior of each of sabot petals 1 is placed against penetrator 11. The edges of adjacent sabot petals 1 are fitted flush against each other to form a cylinder tightly fitted about penetrator 11. Sabot petals 1 are secured in place against penetrator 11 by a hard plastic ring, called an obturator (not shown), in obturator slot 5. When kinetic energy projectile 13 is fired from the gun, aerodynamic forces in front air scoop 2 lift sabot petals 1 away from penetrator 11, opening or breaking the obturator. Saddle 3 and rear ramp 6 are formed to reduce the weight of sabot petals 1, but the stiffness of a sabot is thereby reduced because only the area of bulkhead 4 of sabot petals 1 contacts the gun bore. Since the stiffness of the sabot has thus been reduced, kinetic energy projectile 13 flexes at a certain amplitude and at a certain flexing frequency as it travels down the gun bore. As kinetic energy projectile 13 exits the gun bore a high impulse force at one end of kinetic energy projectile 13 causes kinetic energy projectile 13 to proceed in a direction different from that indicated by an axis passing through the center of the gun bore.

Figure 3:
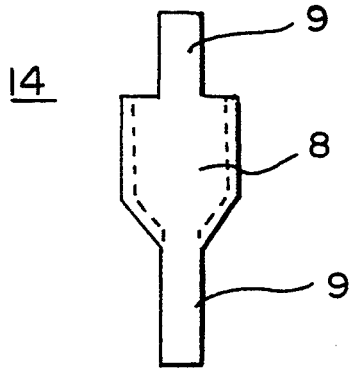
FIG. 3 is a stiffener according to an embodiment of the present invention.
Figure 3A:
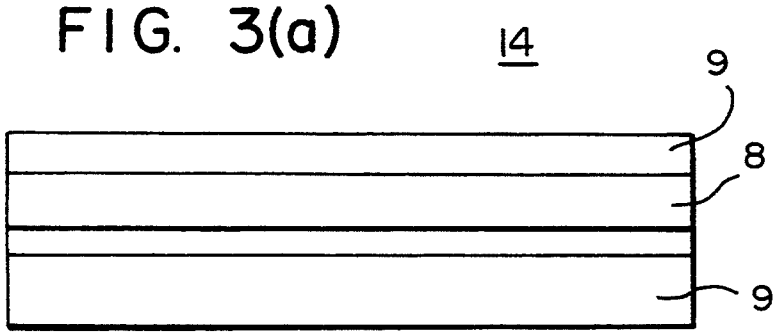
Figure 4:
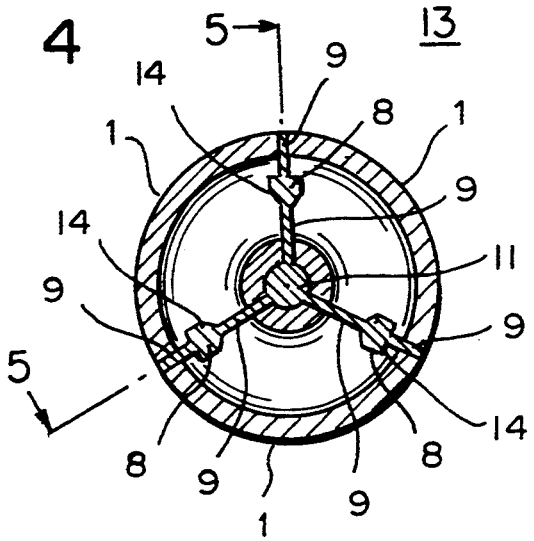
FIG. 4 is a cross section of a sabot according to an embodiment of the present invention, taken along IV—IV in FIG. 5.
Figure 4A:
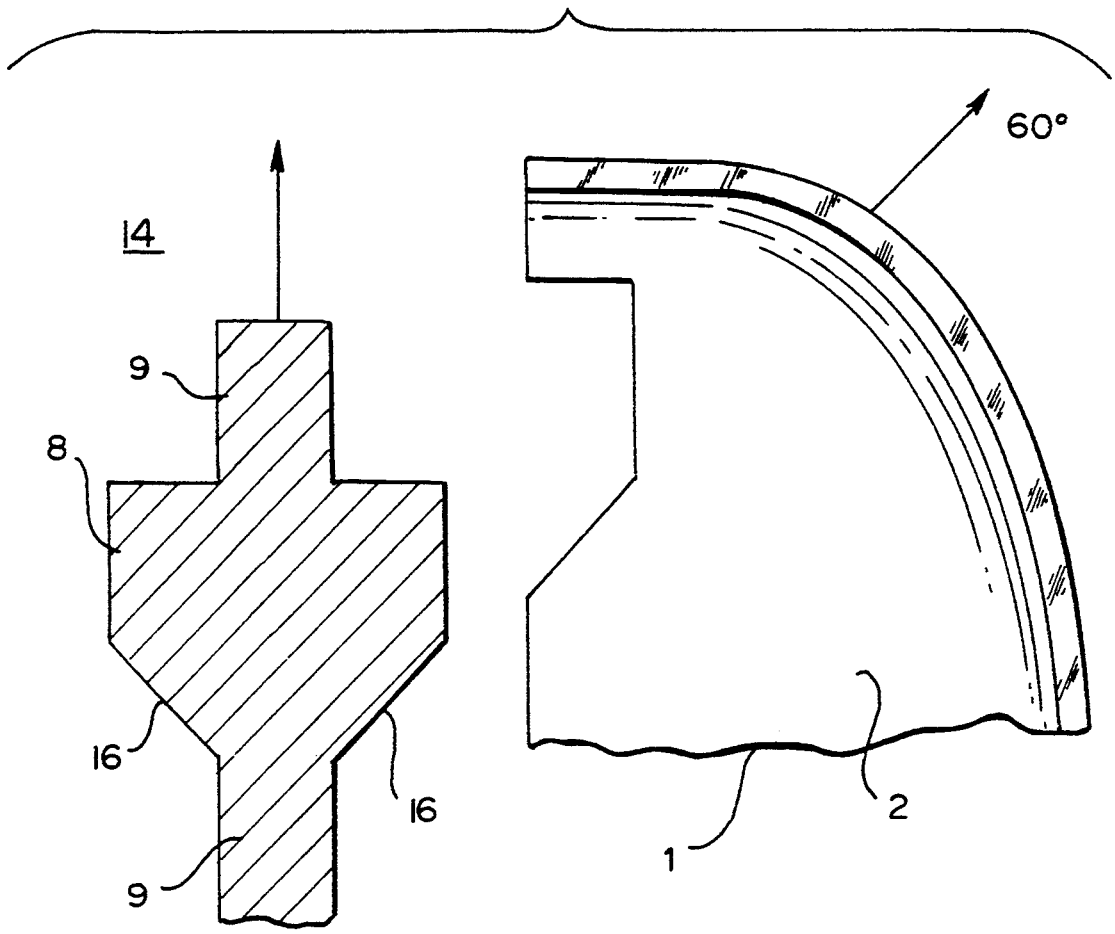
Figure 5:
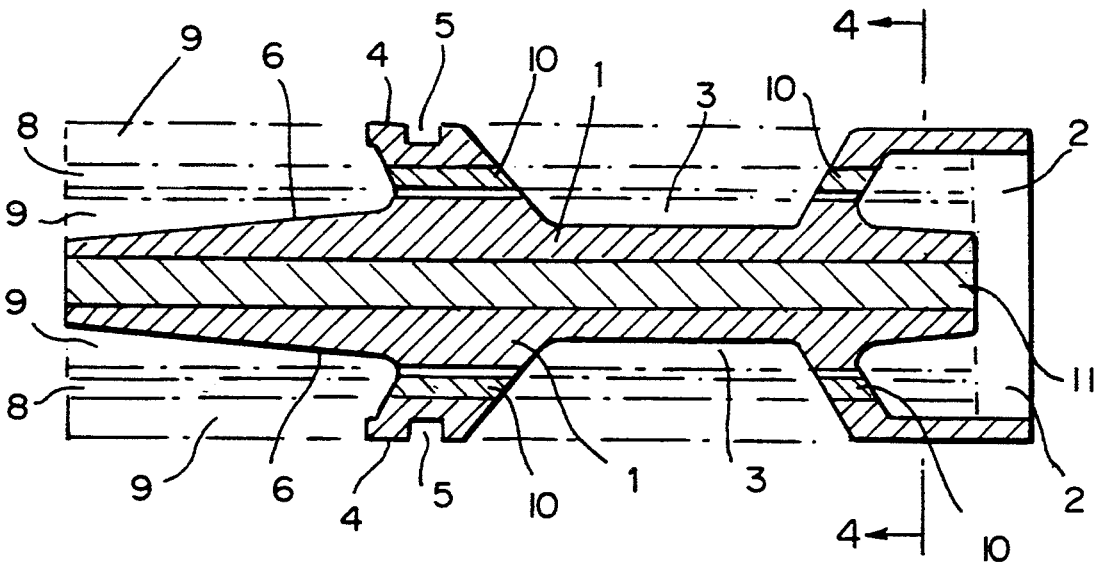
FIG. 5 is a cross-section taken along V—V in FIG. 4.
Figure 6:
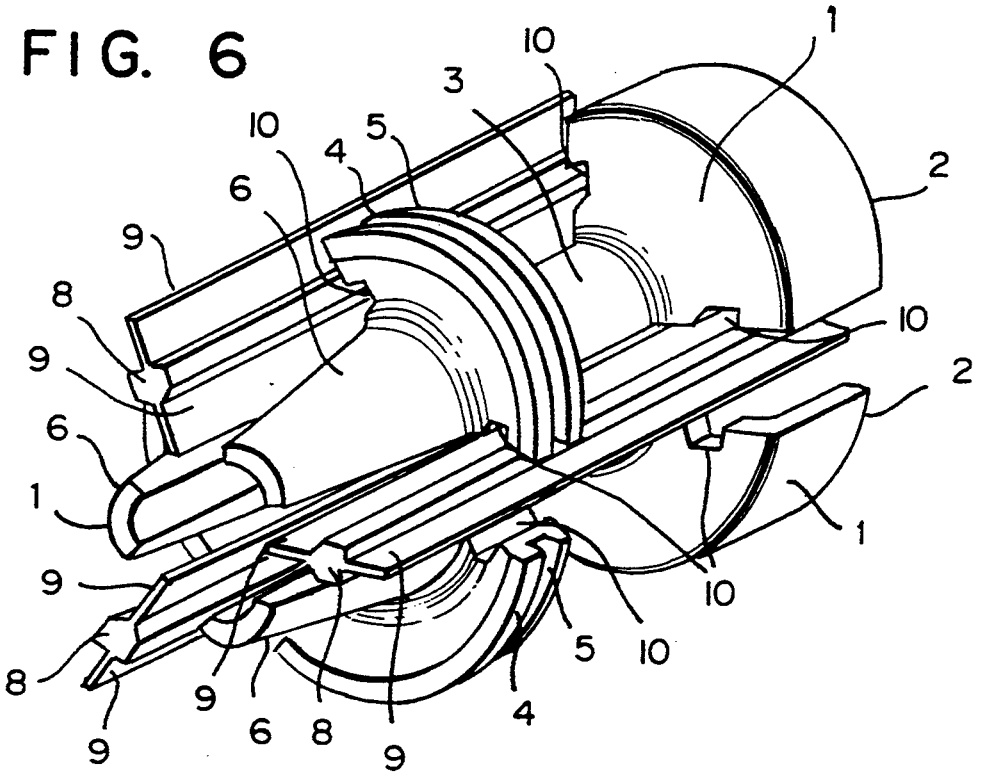
FIG. 6 is a perspective exploded view of sabot petals with stiffeners prior to final sabot assembly.

Referring now to FIGS. 3, 4, and 4(*a*), a stiffener 14 consists of a thick portion 8 and at least one thin portion 9 extending from the edge of thick portion 8. Thick portion 8 is preferably solid, but can be either solid or hollow. Tapered thick portion 8 of stiffener 14 locks stiffener 14 into sabot 15 and expands sabot 15 to seal the gun bore during launch. Thick portion 8 and thin portions 9 are integrally formed from a single piece of a lightweight material, such as, for example, aluminum or metal-matrix composite, which is strong enough to carry a required tension or compression load. The dimensions of thick portion 8 and thin portion 9 and the length of stiffener 14 are optimized for different designs of sabot 15 to minimize in-bore flexing of kinetic energy projectile 13.

Thick portion 8 can have any geometric shape which allows sabot petals 1 to easily discard from penetrator 11 after launch. As kinetic energy projectile 13 exits the gun bore resultant aerodynamic forces equal to the vector sum of the aerodynamic forces in air scoop 2 act along lines passing radially through the midpoints of the outer circumferences of sabot petals 1 to lift sabot petals 1 away from penetrator 11. In the preferred embodiment, sabot 15 has three sabot petals 1, each covering 120° of arc. As kinetic energy projectile 13 exits the gun bore the resultant aerodynamic forces in air scoop 2 act along lines passing through the outer circumferences of sabot petals 1 at an angle of 60° with respect to an axis passing radially through the centers of stiffeners 14. Thick portion 8 has a taper 16 at an end portion thereof to permit the resultant aerodynamic forces in air scoop 2 to separate sabot petals 1 from kinetic energy projectile 13 after kinetic energy projectile 13 is launched from the gun. As long as taper 16 of thick portion 8 has an angle no more than 60° sabot petal 1 can separate from penetrator 11. If this angle becomes greater than 60°, an edge of thick portion 8 may impede separation of sabot petal 1 from penetrator 11, thereby preventing sabot discard.

Generally, sabot 15 may contain more than three sabot petals 1. As kinetic energy projectile 13 exits the gun bore the resultant aerodynamic forces in air scoop 2 act along lines passing radially through the midpoints of the outer circumferences of sabot petals 1 to lift sabot petal 1 away from penetrator 11. In the case where sabot 15 contains N sabot petals 1, each sabot petal 1 covers (360/N)°of arc and the resultant aerodynamic forces in air scoop 2 act along lines passing through the outer circumferences of sabot petals 1 at an angle of (360/2N)° with respect to an axis passing radially through the center of stiffeners 14. As long as taper 16 of thick portion 8 has an angle no more than (360/2N)°, sabot petal 1 can separate from penetrator 11. If this angle becomes greater than (360/2N)° an edge of thick portion 8 will hold sabot petal 1 against penetrator 11, thereby preventing sabot discard.

Referring now to FIG. 4, sabot 15 is first machined, or otherwise formed in one piece into its full-diameter annular dimension. Then, three radial cuts are made to form three sabot petals 1. Sabot petals 1 are assembled about penetrator 11 with thin portions 9 of stiffeners 14 between adjacent edges of sabot petals 1. The thicknesses of thin portions 9 are equal to the thickness of material that was removed when the annulus was cut to form sabot petals 1. The presence of thin portions 9 restores the circumference of the three sabot petals 1 to its original circle, thereby eliminating the need for a further machining step.

Notches 10 in sabot petals 1 accommodate thick portion 8 to permit the remainder of the edges of sabot petals 1 to contact the surfaces of thin portions 9. Thin portions 9 preferably extend outward to the outer circumference of sabot 15 where they may contact the bore. Such contact provides force carry-through from the bore to penetrator 11, thereby reducing the tendency of penetrator 11 to flex during its travel down the bore. Sabot petals 1 and stiffeners 14 are secured together by an obturator (not shown), in obturator slot 5.

In addition to the direct support of penetrator 11 provided by the force carry-through from bore to penetrator 11, additional stiffening is achieved by the combination of thin portions 9 and thick portions 8, in a manner similar to the strength attained in a structural "I" beam. As in an "I" beam, bending moments created by flexing are transmitted by thin portions 9 to thick portion 8, which can support relatively large bending moments. The transmission of the bending moments from sabot 15 to stiffeners 14 increases the effective longitudinal stiffness of sabot 15 while only negligibly increasing the weight of the complete kinetic energy projectile 13. The amplitude of flexing and the flexing frequency are minimized, and the impulse force acting at one end of kinetic energy projectile 13 as it exits the gun bore is correspondingly lessened. Aiming dispersion is thereby reduced because kinetic energy projectile 13 exits the gun bore in a direction closer in coincidence to the axis of the gun bore.

In some applications, thick portion 8 may be omitted from stiffener 14. In this case, advantage is taken of the fact that the presence of thin portions 9 compensates for the material removed in separating sabot petals 1. In addition, the force carry-through between the gun bore and kinetic energy projectile 13 reduces the tendency for kinetic energy projectile 13 to flex or whip during its travel down the gun bore.

In other application one or the other of thin portions 9 may be omitted. That is, the radially inner thin portion 9 between kinetic energy projectile 13 and thick portion 8 may be omitted. In this case, stiffening is attained by the "I" beam effect, and by the force carry-through from the gun bore to sabot petals 1. Alternately, radially outer thin portion 9 between thick portion 8 and the gun bore may be omitted. In this case, stiffening is attained by the "I" beam effect between the kinetic energy projectile 13 and the remainder of sabot 15.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sabot for a kinetic energy projectile comprising:
a plurality of sabot petals;
said plurality of sabot petals fitting together to form an annulus about said kinetic energy projectile;
a stiffener, radially disposed between each pair of adjacent edges of said sabot petals; and
stiffening means in each of said stiffeners for resisting a bending of said kinetic energy projectile, whereby an aiming dispersion is reduced.

2. A sabot for a kinetic energy projectile comprising:
a plurality of sabot petals;
said plurality of sabot petals fitting together to form an annulus about said kinetic energy projectile;
a stiffener, radially disposed between each pair of adjacent edges of said sabot petals;

said stiffener having a thin portion and a thick portion; a notch in at least one sabot petal accommodating said thick portion; and permitting means for permitting said stiffener and said plurality of sabot petals to be aerodynamically discarded independently of each other.

3. Apparatus according to claim 2, wherein said permitting means includes:

a taper with a predetermined angle at an inner end of said thick portion; and said predetermined angle is measured from an axis passing longitudinally through a center of said stiffener.

4. Apparatus according to claim 3, wherein:

said plurality of sabot petals includes N sabot petals; and said predetermined angle is no more than (360/2N)°.

5. Apparatus according to claim 3, wherein:

said plurality of sabot petals includes 3 sabot petals; and said predetermined angle is no more than 60°.

6. A method for manufacturing a sabot for a kinetic energy projectile comprising:

forming an annular sabot;

radially cutting said annular sabot at a plurality of locations to form a plurality of sabot petals;

the step of radially cutting removing a predetermined width of material from said annular sabot;

assembling said plurality of sabot petals into an annulus;

the step of assembling including placing a stiffener between each adjacent pair of edges of said plurality of sabot petals; and said stiffener having a thickness substantially equal to said predetermined width, whereby said annulus has a diameter substantially equal to a diameter of said annular sabot before the step of radially cutting.

7. A method according to claim 6, further comprising:

forming a thick portion on said stiffener;

forming a notch in at least one of said adjacent pair of edges; and said notch accommodating said thick portion.

* * * * *